(12) United States Patent
Batarseh et al.

(10) Patent No.: US 7,149,096 B2
(45) Date of Patent: Dec. 12, 2006

(54) POWER CONVERTER WITH INTERLEAVED TOPOLOGY

(75) Inventors: Issa Batarseh, Orlando, FL (US); Jaber Abu Qahouq, Orlando, FL (US); Hong Mao, Orlando, FL (US)

(73) Assignee: Astec International Limited, Kowloon (HK)

( * ) Notice: Subject to any disclaimer, the term of this patent is extended or adjusted under 35 U.S.C. 154(b) by 195 days.

(21) Appl. No.: 10/851,901

(22) Filed: May 21, 2004

(65) Prior Publication Data

US 2005/0180173 A1  Aug. 18, 2005

Related U.S. Application Data

(60) Provisional application No. 60/545,737, filed on Feb. 18, 2004.

(51) Int. Cl.
*H02M 3/335* (2006.01)

(52) U.S. Cl. .................................................. 363/16

(58) Field of Classification Search ............... 363/16, 363/17, 20, 65, 71
See application file for complete search history.

(56) References Cited

U.S. PATENT DOCUMENTS

| | | | |
|---|---|---|---|
| 5,008,795 A | 4/1991 | Parsley et al. | |
| 5,508,903 A | 4/1996 | Alexndrov | |
| 5,808,879 A | 9/1998 | Liu et al. | |
| 5,933,338 A | 8/1999 | Wallace | |
| 6,163,466 A | 12/2000 | Davila, Jr. et al. | |
| 6,388,898 B1 | 5/2002 | Fan et al. | |
| 6,400,582 B1 | 6/2002 | Hemena et al. | |
| 6,538,905 B1 | 3/2003 | Greenfeld et al. | |
| 6,549,436 B1 | 4/2003 | Sun | |
| 6,594,159 B1 * | 7/2003 | Schlecht | 363/16 |
| 6,731,520 B1 * | 5/2004 | Schlecht | 363/16 |
| 2003/0174521 A1 | 9/2003 | Batarseh et al. | |

FOREIGN PATENT DOCUMENTS

JP  11055941  2/1999

OTHER PUBLICATIONS

Xunwei Zhou, "Low-Voltage High-Efficiency Fast Transient Voltage Regulator Modules," Ph.D. Dissertation, Virginia Polytechnic Inst. State Univ., Blackburg, 1999.
Y. Panov and M. Jovanovic, "Design and Performance Evaluation of Low-Voltage/High Current DC/DC On-Board Modules," IEEE Fourteenth Annual Applied Power Electronics Conference and Exposition, APEC '99, vol. 1, pp. 545-552, 1999.
X. Zhu, Bo Yang, L. Amoroso, F. C. Lee, and P.Wong, "A Novel High-Input-Voltage, High Efficiency and Fast Transient Voltage Regulator Module: The Push-Pull Forward Converter," Fourteenth Annual Applied Power Electronics Conference and Exposition, 1999. APEC '99., vol. 1, Mar. 14-18, 1999, pp. 279-283, vol. 1.

(Continued)

*Primary Examiner*—Adolf Berhane
(74) *Attorney, Agent, or Firm*—Harness, Dickey & Pierce, P.L.C.

(57) ABSTRACT

A power converter includes a first transformer that has a primary winding and a secondary winding. The secondary winding is coupled to a first secondary side. A second transformer has a primary winding and a secondary winding. The secondary winding is coupled to a second secondary side. The primary windings of the first and second transformers are coupled in parallel to a primary side through respective windings of a transformer that has inverse coupled windings. The secondary windings of the first and second transformer are coupled in parallel. The second secondary side is interleaved with the first secondary side.

20 Claims, 11 Drawing Sheets

OTHER PUBLICATIONS

Jaber A. Abu-Qahouq, Hong Mao, and Issa Batarseh, "Novel Control Method for Multiphase Low-Voltage High-Current Fast Transient VRMs," 2002 IEEE 33rd Annual Power Electronics Specialists Conference, PESC '02, pp. 1576-1581, vol. 4, 2002.

Hong Mao, Jaber Abu-Qahouq, Sbiguo Luo, and Issa Batarseh, "New Zero-Voltage-Switching Half-Bridge DC-DC Converter and PWM Control Method," Eighteenth Annual IEEE Applied Power Electronics Conference and Exposition, APEC 2003, vol. 2, pp. 635-640, Feb. 2003.

P. Xu, R. Yuan-Chen, M. Ye, and F. C. Lee, "A Family of Novel Interleaved DC/DC Converters for Low-Voltage High-Current Voltage Regulator Module Applications," IEEE 32nd Annual Power Electronics Specialists Conference, 2001, PESC 2001, Jun. 17-21, 2001, vol. 3, pp. 1507-1511.

J. Sebastian, J. A. Cobos, Garcia, O., and J. Uceda, "An Overall Study of the Half-Bridge Complementary-Control DC-to-DC Converter," Power Electronics Specialists Conference, 1995, pp. 1229-1235.

Jaber A. Abu Qahouq, "High-Density High-Current Fast-Transient Low-Voltage DC-DC Converters," Ph.D. Dissertation, University of Central Florida, Orlando, Florida, 2003.

* cited by examiner

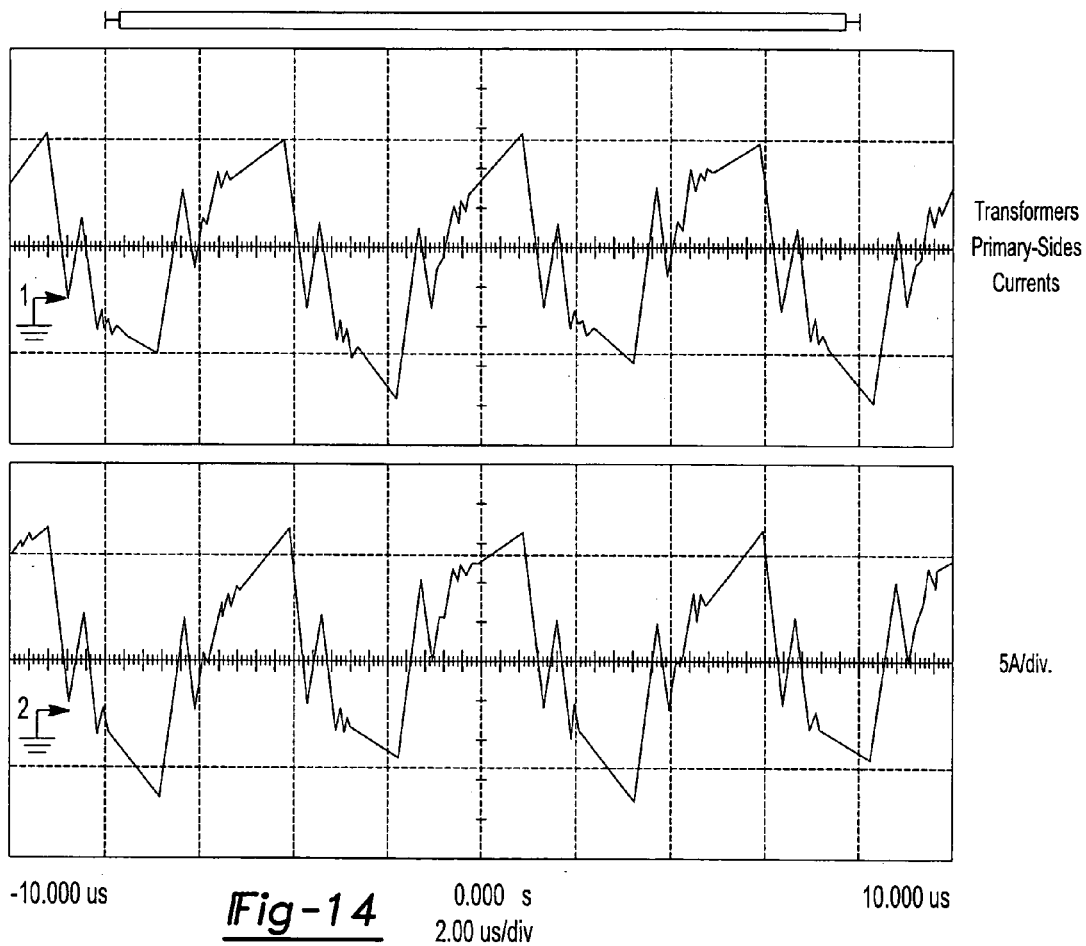

POWER CONVERTER WITH INTERLEAVED TOPOLOGY

CROSS-REFERENCE TO RELATED APPLICATIONS

This application claims the benefit of U.S. Provisional Application No. 60/545,737 filed on Feb. 18, 2004.

FIELD OF THE INVENTION

The present invention relates to power converters, and, more particularly, to direct current to direct current (DC—DC) converters.

BACKGROUND OF THE INVENTION

Power converters, which receive an unregulated input voltage and convert the voltage to a specified level, are commonly used in electronic components. Designers of power converters such as point-of-load (POL) direct current to direct current converters DC—DC converters, and voltage regulator modules (VRMs) must satisfy increasingly stringent requirements established by manufacturers of electronic components such as processors. High power/current density, low output voltage deviation in both steady-state and transient conditions, high efficiency and physically small converters are just a few examples of the specifications that must be met by power converter manufacturers. The transient response (e.g., the time it takes for the output power levels to stabilize) and efficiency of the power converter are affected by these requirements.

Several actions may be taken to improve the transient response and the efficiency of a power converter. For example, the switching frequency may be increased. Decreasing the inductance of the output inductor also improves the transient response and efficiency of a power converter.

There are a few conventional approaches to address these problems. For both isolated and non-isolated topologies, paralleled synchronous rectifiers are typically used for high-current low-voltage converters. However, using synchronous rectifiers limits the ability to increase the switching frequency.

Another approach involves an interleaving technique applied to non-isolated step-down DC—DC power converters (also known as buck converters) and the interleaved series connected isolated topologies. Interleaved non-isolated buck topology is typically used in 5 volt (V) to 12V input VRMs or POL DC—DC converters where N converters are paralleled at the input and the output terminals. There are several disadvantages to these approaches such as the power converter having a relatively high current per channel, a higher switching frequency per switch, a smaller step down ratio for lower output voltages, and a high ripple effect (i.e., the AC component from a DC power supply arising from components within the power supply). What is needed is a device that overcomes these disadvantages.

SUMMARY OF THE INVENTION

One embodiment of the invention involves a power converter that includes a first transformer that has a primary winding and a secondary winding. The primary winding is coupled to a first secondary side. A second transformer has a primary winding and a secondary winding. The secondary winding is coupled to a second secondary side. The primary windings of the first and second transformers are coupled in parallel to a primary side through respective windings of a transformer that has inverse coupled windings. The secondary windings of the first and second transformer are coupled in parallel. The second secondary side is interleaved with the first secondary side.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 14 is a graph that illustrates a waveform for the currents in the primary winding of the isolation transformers in accordance with one embodiment of the invention; and FIG. 15 is a flow diagram of one method of forming a power converter in accordance with one embodiment of the invention.

DETAILED DESCRIPTION

The following description of the embodiments is merely exemplary in nature and is in no way intended to limit the invention, its application, or its uses. The transient response and efficiency of a power converter is improved by connecting an transformer having inverse coupled windings to the primary sides of two isolation transformers and interleaving, for example, current doublers as the secondary sides of the isolation transformers. This configuration allows the switches on the secondary sides to operate at a lower switching frequency than the switches on the primary side. In addition, the efficiency and thermal management of the power converter is further enhanced by having the primary and secondary windings of at least two transformers in a parallel-primary and a parallel-secondary configuration. This configuration causes the current to be shared at the primary sides as well as at the secondary sides.

To better understand the claimed invention, the discussion below is parsed in the following manner: Section A discusses transformer connection configurations for two or more isolation transformers; Section B describes the interleaving technique for isolated topologies; Section C compares theoretical topologies; Section D describes extending the interleaving technique for more interleaved phases and the generation of a family of interleaved converters; and, Section E presents simulation and experimental results that support the claimed invention.

A. Transformers' Primary and Secondary Sides Connection Configurations

For two transformers there are typically four connection configurations for the primary and the secondary windings that include: series-primary series-secondary, parallel-primary series-secondary, series-primary parallel-secondary and parallel-primary parallel-secondary. To achieve interleaving for the output switches and inductors, the secondary sides must be connected in parallel. It is also preferable that the primary-side windings be connected in parallel. This permits the current to be shared between the parallel windings located in the primary sides as well as the current being shared between the parallel windings on the secondary sides.

The third configuration, series-primary parallel-secondary, may be used in which the output current is shared between the transformers' secondary sides. However, the primary current at the transformers' primary sides is not shared. This is due to the primary sides being connected in series, causing each primary side to carry the same current.

B. Interleaving Technique for Isolated Topologies

Figure 1:
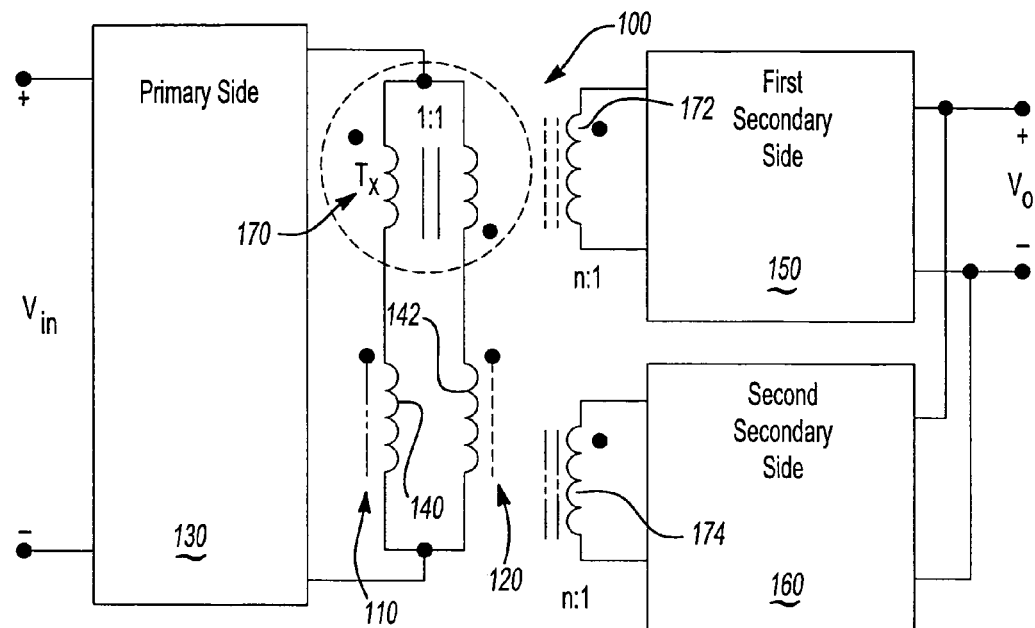
FIG. 1 is a block diagram of a parallel-primary and parallel-secondary configuration for a power converter in accordance with one embodiment of the invention.
Figure 2:
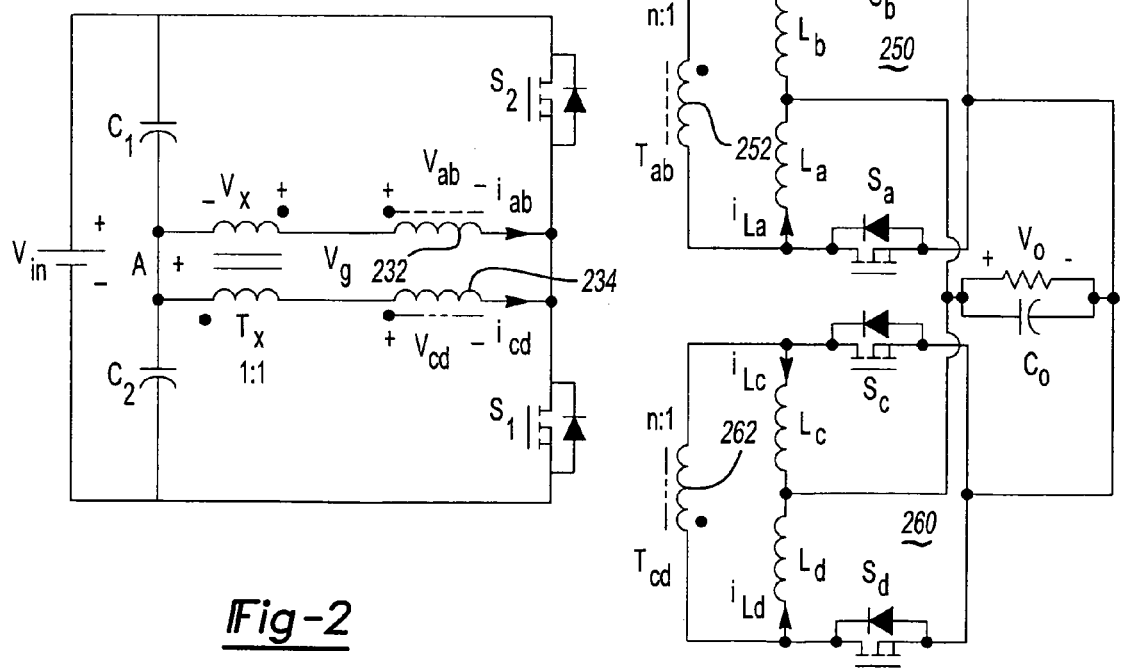
FIG. 2 is a schematic diagram of a DC—DC converter in accordance with one embodiment of the invention.
Figure 3:
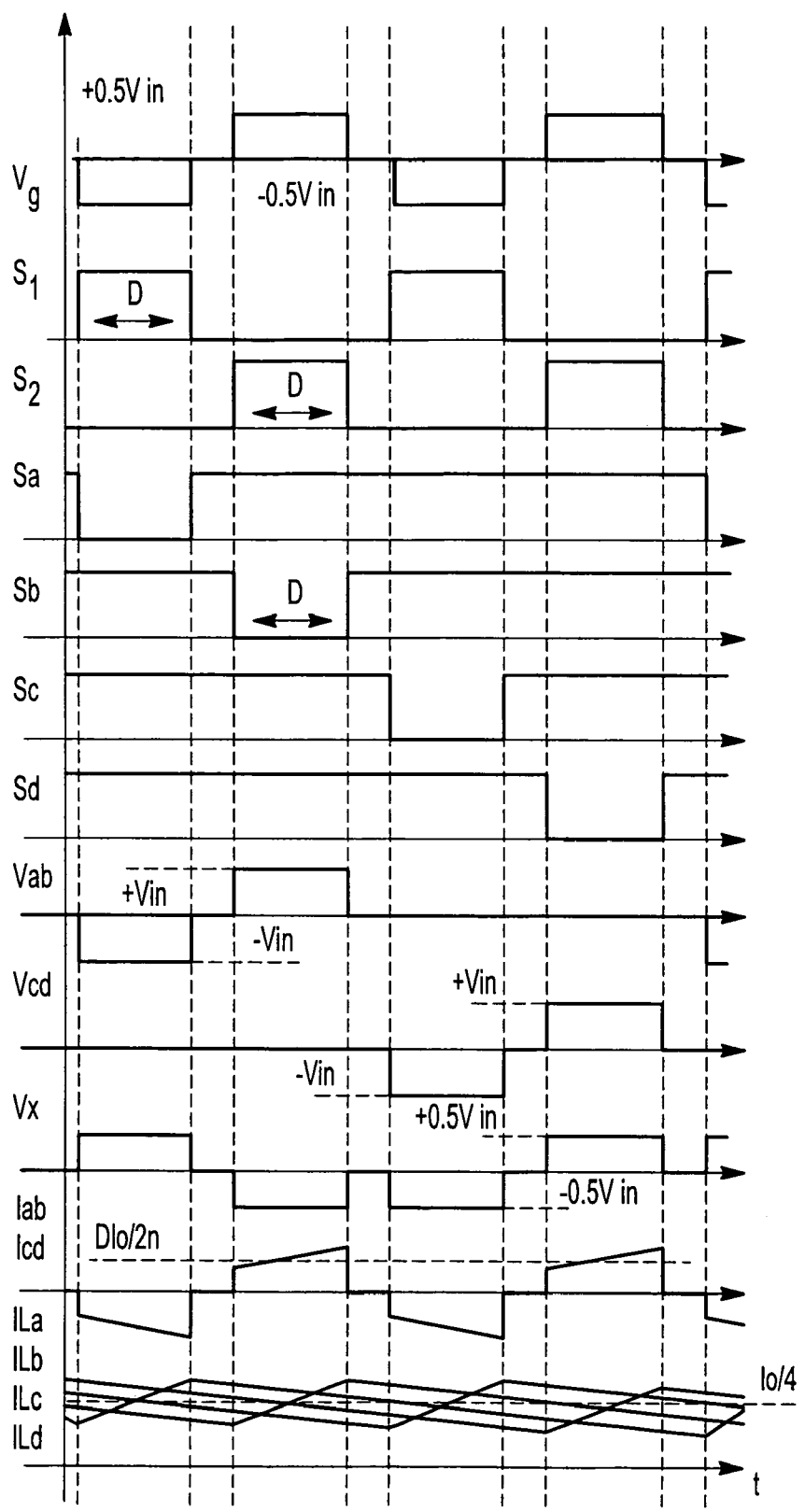
FIG. 3 shows the main theoretical switching waveforms for the DC—DC converter of FIG. 2.

FIGS. 1–3 illustrate the interleaving technique as applied to two current doublers that form the secondary sides of a power converter. A current doubler typically includes two inductors that possess equal inductance values arranged to deliver current in a balanced fashion to an output load, the output current being the sum of the two inductor currents.

FIG. 1 is a schematic diagram of the parallel-primary and the parallel-secondary configuration used for a power converter 100 in accordance with one embodiment of the invention. Power converter 100 includes primary side 130 and secondary sides 150, 160. The primary side 130 may be any type such as a half-bridge 230 (FIG. 2), a phase shifted full-bridge, an active-clamp, or other suitable primary side. The secondary sides 150, 160 may also be any type such as current doublers 250, 260 (FIG. 2), forward and center tapped topologies, newly created converters, or any other suitable secondary side.

Referring to FIG. 1, primary side 130 is coupled to the parallel primary windings 140, 142. First and secondary sides (e.g. current doublers) 150, 160 are coupled to secondary windings 172, 174, respectively. Primary windings 140, 142 and secondary windings 172, 174 form two parallel transformers 110, 120, respectively.

A small transformer $T_x$ 170 with inverse coupled windings is added at primary side 130 to realize the interleaving between the current doublers of first and secondary sides 150, 160 by transferring the energy between the two paralleled branches. $T_x$ 170 provides a path for the energy between the paralleled transformers' primary sides when one of the primary side transformer windings is shorted by the secondary side switches. In other words, when one or more of the interleaved channels has its secondary side topology switches turned ON by a way it shorts that channel transformer windings, $T_x$ 170 will provide energy path to other channel(s) without shorting it. Without $T_x$ 170, the two paralleled transformers 110, 120 are shorted together when the two switches of each current doubler are turned on at the same time during the freewheeling period. Both current doublers therefore switch together (no interleaving) instead of switching sequentially (interleaving). The additional transformer $T_x$ 170 with 1:1 turns ratio is small and is relatively simple to design for several reasons. First, both its windings carry a small current. Generally, this current is about equal to half of the current in a non-interleaved topology. Second, isolation between the two windings is not critical since they are not connected to the secondary side of power converter 100 and there is little difficulty in achieving the number of turns since the turns ratio is 1:1.

It should be understood that a transformer having inverse coupled windings in the broadest sense refers to the polarity in which its windings are coupled to the respective primary windings of the transformers coupling the secondary sides of the power converter to the primary side of the power converter. That is, the respective windings of the transformer having inverse coupled windings are coupled to the primary windings of respective transformers coupling the secondary sides to the primary sides with opposite polarity as shown in FIG. 1.

Using this configuration, the current is shared at the transformers' primary side 140 as it is at secondary sides 150, 160. It will be appreciated that the components and switches of primary side 130 typically do not increase as the number of phases increases.

FIG. 2 is a schematic diagram of power converter 200 in accordance with one embodiment of the invention. Power converter 200 converts an unregulated input voltage ($V_{in}$) to an output voltage ($V_{out}$). Power converter 200 has a primary side 230 coupled to two secondary sides 250, 260 by two isolation transformers $T_{ab}$ and $T_{cd}$. Primary side 230 is illustrated by a half-bridge coupled to input voltage $V_{in}$ and to primary windings 232, 234 of transformers $T_{ab}$, $T_{cd}$, respectively, that includes primary switches $S_1$, $S_2$ and capacitors $C_1$, $C_2$. Primary side 230 also includes transformer $T_x$ having inverse coupled windings disposed between node A (the junction of capacitors $C_1$, $C_2$) and the primary windings 232, 234 of isolation transformers $T_{ab}$ and $T_{cd}$. Primary windings 232, 234 are coupled in parallel through respective inverse coupled windings of transformer $T_x$ to primary side 230 at node A.

Given this description of primary side 230, the discussion now turns to secondary sides 250, 260. Secondary side 250 is illustratively a first current doubler coupled to a secondary winding 252 of transformer $T_{ab}$ and secondary side 260 is illustratively a second current doubler coupled to a secondary winding 262 of $T_{cd}$. Secondary side 250 includes first and second inductors $L_a$, $L_b$, and first and second switches $S_a$ and $S_b$ that are connected to inductors $L_a$ and $L_b$, respectively.

Similarly, secondary side 260 includes a first and second inductors $L_c$, $L_d$ and switches $S_c$, $S_d$ that are connected to inductors $L_c$, $L_d$, respectively. It will be appreciated by a skilled artisan that although switches $S_1$, $S_2$, $S_a$, $S_b$, $S_c$ and $S_d$ are schematically shown as MOSFETS, other suitable transistors may also be used such as bipolar junction transistors.

Secondary side 250 has an output across the junction of inductors $L_a$, $L_b$ and the junction of switches $S_a$, $S_b$ and secondary side 260 has an output across the junction of inductors $L_c$, $L_d$ and switches $S_c$, $S_d$. The outputs of secondary sides 250, 260, represented by $V_o$, are coupled in parallel with the junction of inductors $L_a$, $L_b$ of secondary side 250 coupled to the junction of $L_c$, $L_d$ of secondary side 260 and the junction of switches $S_a$, $S_b$ coupled to the junction of switches $S_c$, $S_d$. A filter capacitor, $C_o$, is coupled across the outputs of secondary sides 250, 260.

FIG. 3 shows the main theoretical switching waveforms of the topology of FIG. 2 when conventional symmetric control is used. It should be understood that other control methods can be used such as asymmetrical control and Duty-Cycle-Shifted Control (DCS). The primary side currents, $i_{ab}$ and $i_{cd}$, are half compared to the non-interleaved topology and the series connected primary sides topology.

Figure 4:
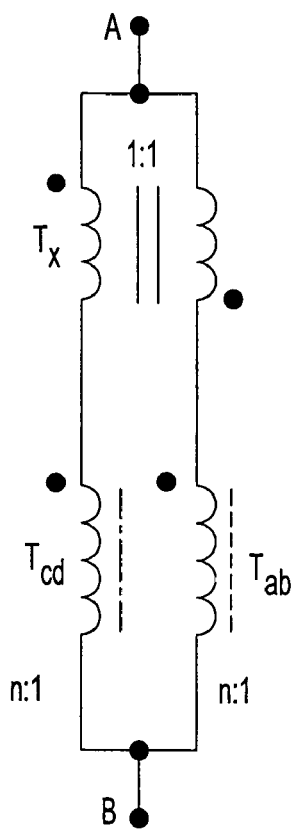
FIG. 4 is a schematic diagram showing the primary windings of two isolation transformers coupled in parallel through the respective windings of a transformer having inverse coupled windings in accordance with one embodiment of the invention.
Figure 5:
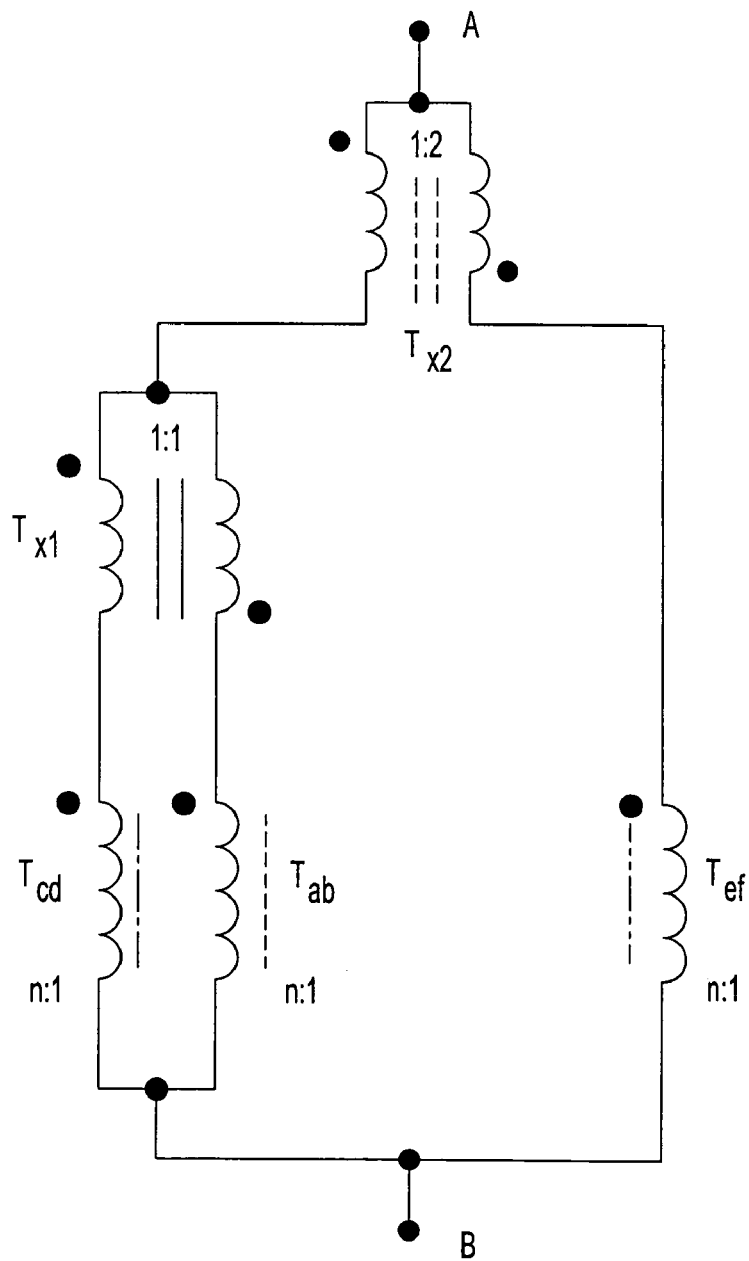
FIG. 5 is a schematic diagram showing the primary windings of three isolation transformers coupled in parallel through respective windings of two transformers having inverse coupled windings in accordance with one embodiment of the invention.
Figure 6:
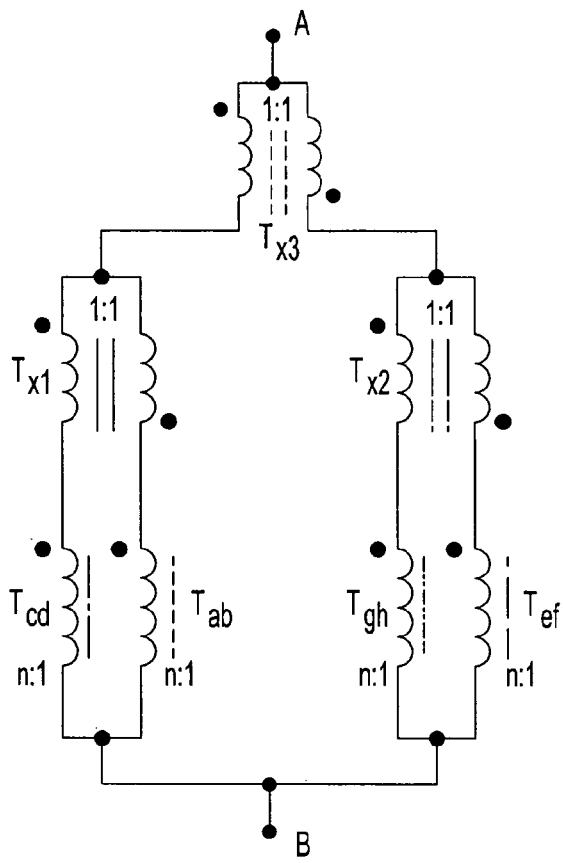
FIG. 6 is a schematic diagram showing the primary windings of four isolation transformers coupled in parallel through respective windings of three transformers having inverse coupled windings in accordance with one embodiment of the invention.

C. Extension of the Interleaving Method for N Interleaved Phases and a Family of Interleaved Topologies While FIGS. 1–3 show the interleaving technique being applied to two current doublers, one skilled in the art will appreciate that the interleaving technique may be extended to apply to more output channels or current doublers. For simplicity, FIG. 4-6 are schematic diagrams solely of the primary side isolation transformers windings and the transformers having inverse coupled windings. As shown in FIG. 4, one skilled in the art will appreciate that including additional transformers or inductors having inverse coupled windings as necessary further extends the interleaving method for N interleaved phases. FIG. 5 shows the primary side windings for isolation transformers $T_{ab}$, $T_{cd}$, $T_{ef}$ used in conjunction with three interleaved current doublers (not shown), or any other secondary-side topology, used at the secondary side. Additionally, since there are an odd number of isolation transformers, transformer $T_{x2}$ having inverse coupled windings has a turns ratio of 1:2.

FIG. 6 shows the primary side for four interleaved current doublers (not shown) at the secondary side, where $T_{ab}$, $T_{cd}$, $T_{ef}$ and $T_{gh}$ are the isolation transformers, each associated with one of the current doublers. $T_{x1}$, $T_{x2}$ and $T_{x3}$ are the transformers having inverse coupled windings for parallel primary and secondary sides' transformers interleaving realization.

For N interleaved isolation transformers or secondary sides (2N output channels when current-doublers are used), N-1 transformers having inverse coupled windings are required. Moreover, all the transformers having inverse coupled windings have a 1:1 turns ratio when an even number of isolation transformers are interleaved. In contrast, when an odd number of isolation transformers are interleaved, the turns ratio of one of the transformers having inverse coupled windings should be 2:1, as is the case in $T_{x2}$ of FIG. 5, in order to maintain equal current sharing between the transformers.

Figure 7:
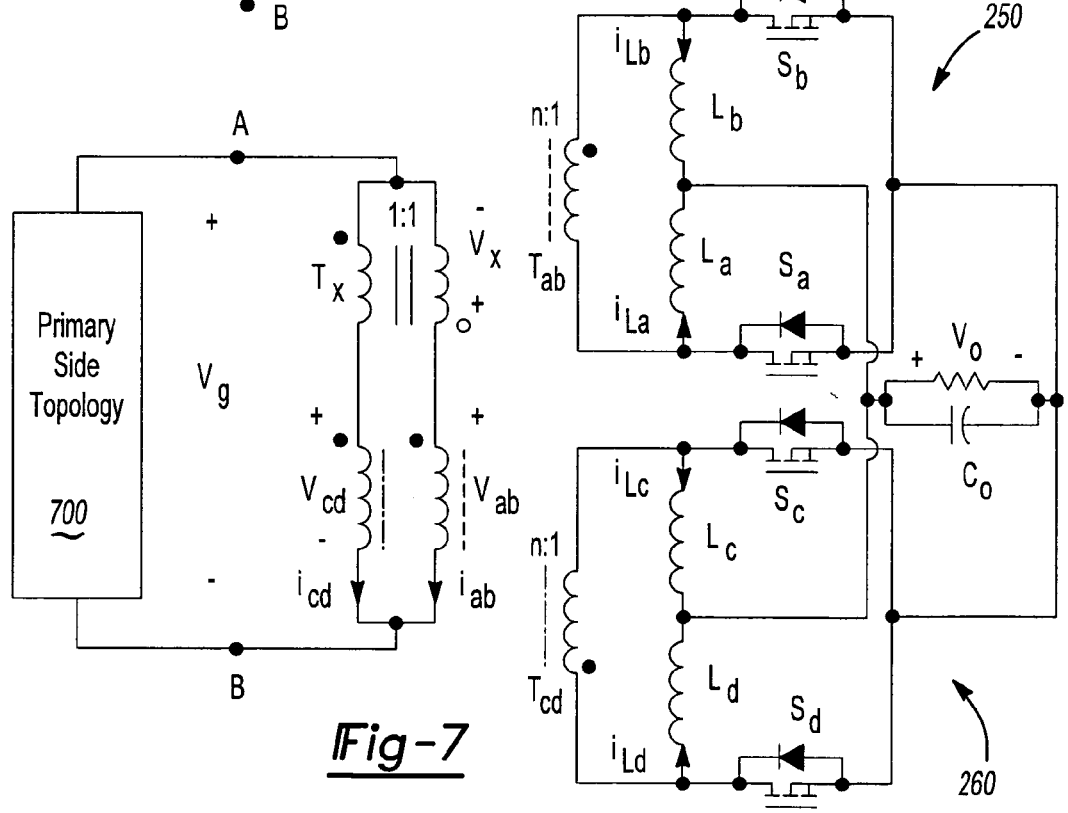
FIG. 7 is a schematic diagram of a power converter having two interleaved current doublers in which any type of a primary side may be used in accordance with one embodiment of the invention.

While the invention has been described with reference to DC—DC converter where a half-bridge is used for the primary side and current doublers are used for the secondary sides, it should be understood that topologies other than half-bridges can be used for the primary side, including the phase-shifted full-bridge and active clamp topologies. FIG. 7 shows an example of the interleaved topology of the present invention where any primary side topology 700 can be used for the primary side. In addition to the current doubler topology, any other secondary side topology can be used for the secondary sides, such as the forward and center-tapped topologies. Since any primary-side topology can be used for the primary side and any secondary side topology can be used for the secondary side, a new family of interleaved power converters can be generated.

D. Theoretical Comparison of Topologies

Generally, the interleaving and non-interleaving topologies have the same number of switches. However, the switching and reverse recovery body diode losses for the interleaved topology are reduced compared to the non-interleaved topology case, especially at higher switching frequencies. This is due to the secondary-side switching being N times smaller for N interleaved current doublers or secondary sides, which can improve the efficiency of the power converter.

The inductors' output currents are phase shifted (or interleaved) by 360°/N, where N is the number of output channels. Consequently, the current ripple cancels at the output capacitance, which allows smaller capacitance to be used. Since the effective output inductance is much smaller, the transient performance is improved for the interleaving topology.

E. Simulation Results

Figure 8:
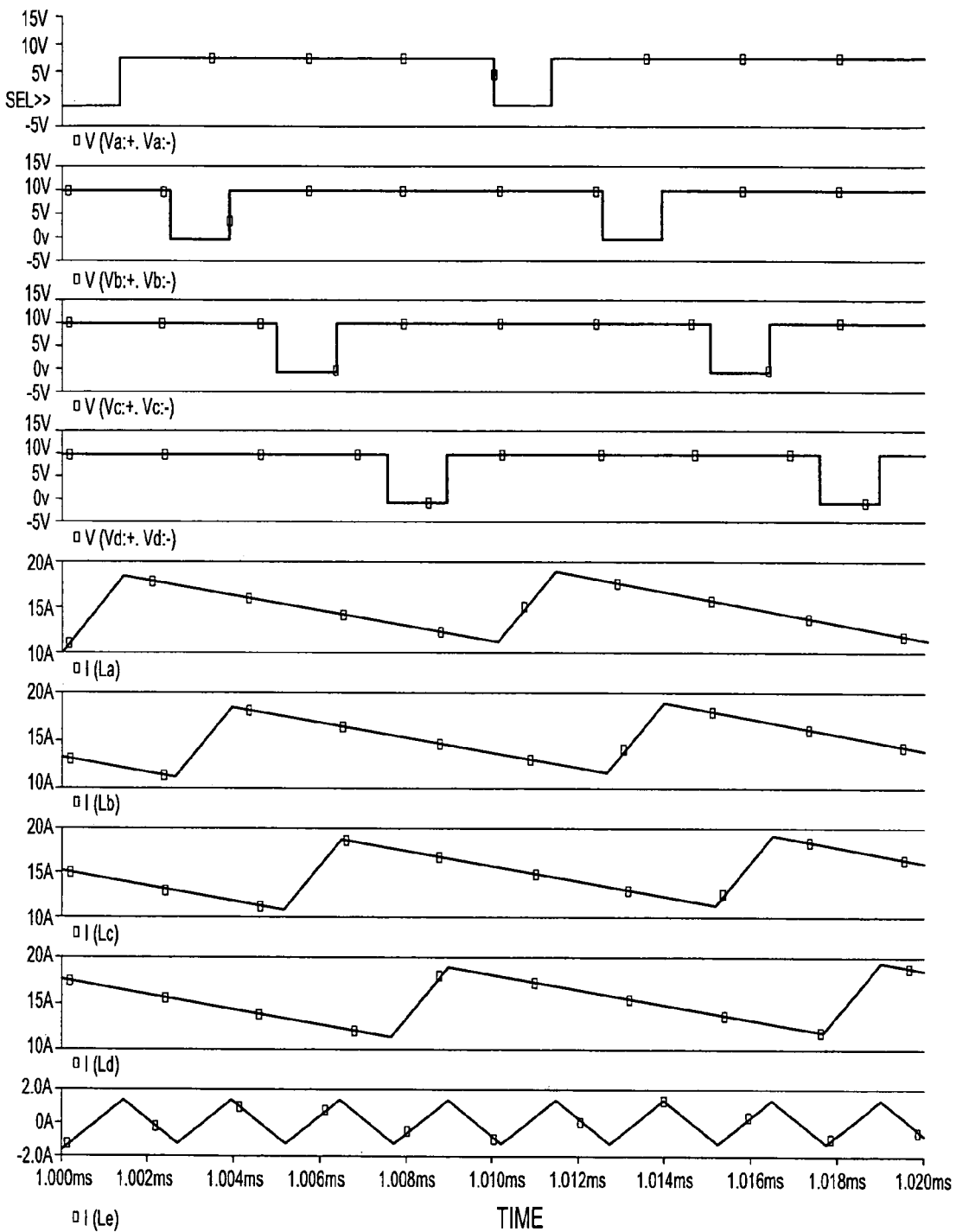
FIG. 8 is a graph of a result from a simulation of a DC—DC converter with an interleaved topology with two current doublers in accordance with one embodiment of the invention.
Figure 9:
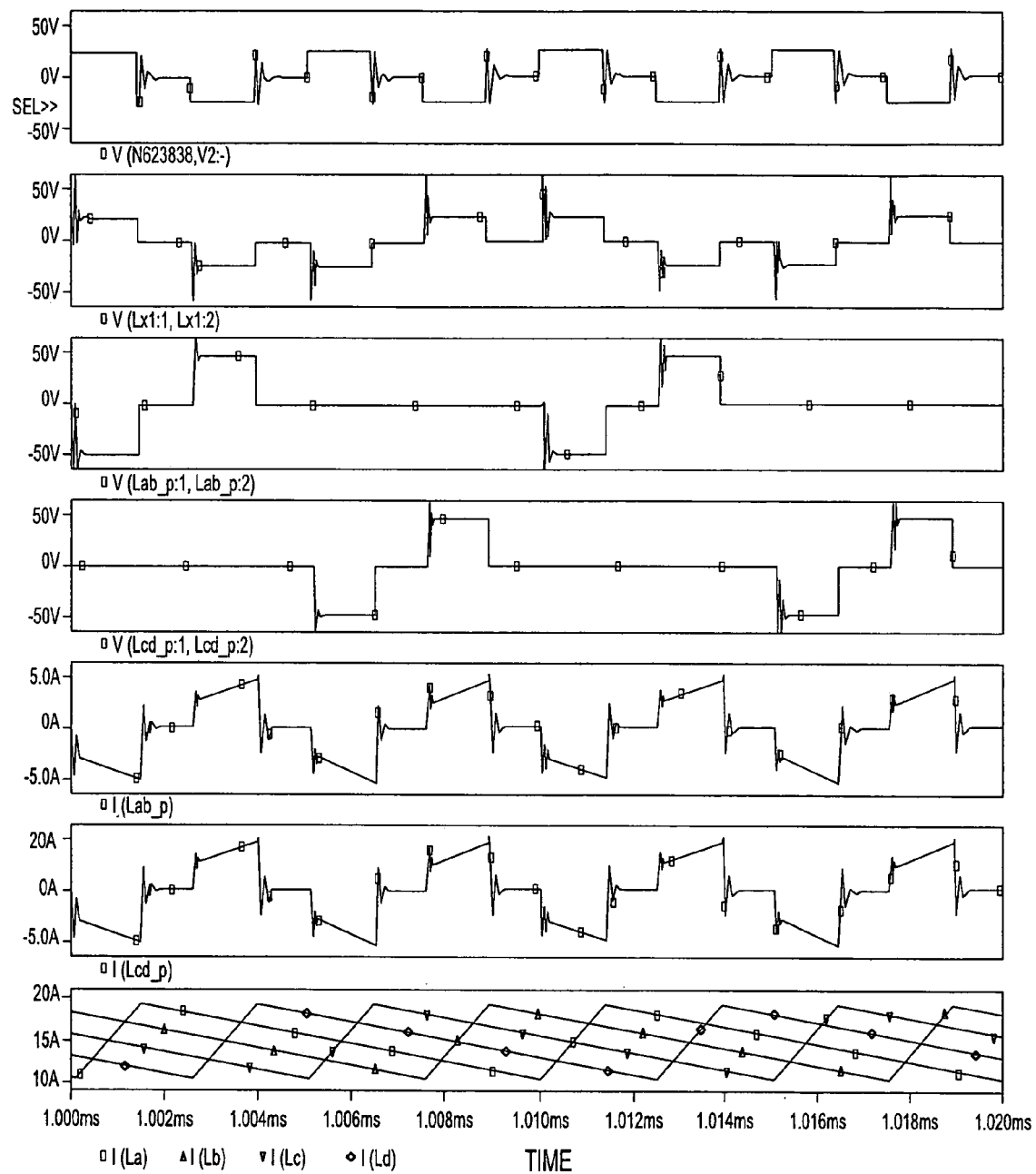
FIG. 9 is a graph of a result from a simulation of a DC—DC converter with an interleaved topology with two current doublers in accordance with one embodiment of the invention.

A conventional power converter and a power converter of one embodiment of the invention described above were simulated. An interleaved four-channel (i.e., two current doublers) with a symmetrically controlled half-bridge, as shown in FIG. 2, was simulated with a 48V input and 1.5V/60 ampere (A) output at 400 kilohertz (kHz). The output inductors $L_a$, $L_b$, $L_c$, $L_d$ were 1.8 micro Henry (μH) each, and the isolation transformers' $T_{ab}$, $T_{cd}$ turns ratios were 4:1. The simulation results are shown in FIGS. 8 and 9. Simulation results for a non-interleaved symmetrically controlled half-bridge with two-channels (one current doubler) also with a 48V input, 1.5V/60 A output at 400 kHz and 1.8 μH output inductors, are shown in FIG. 10.

Figure 10:
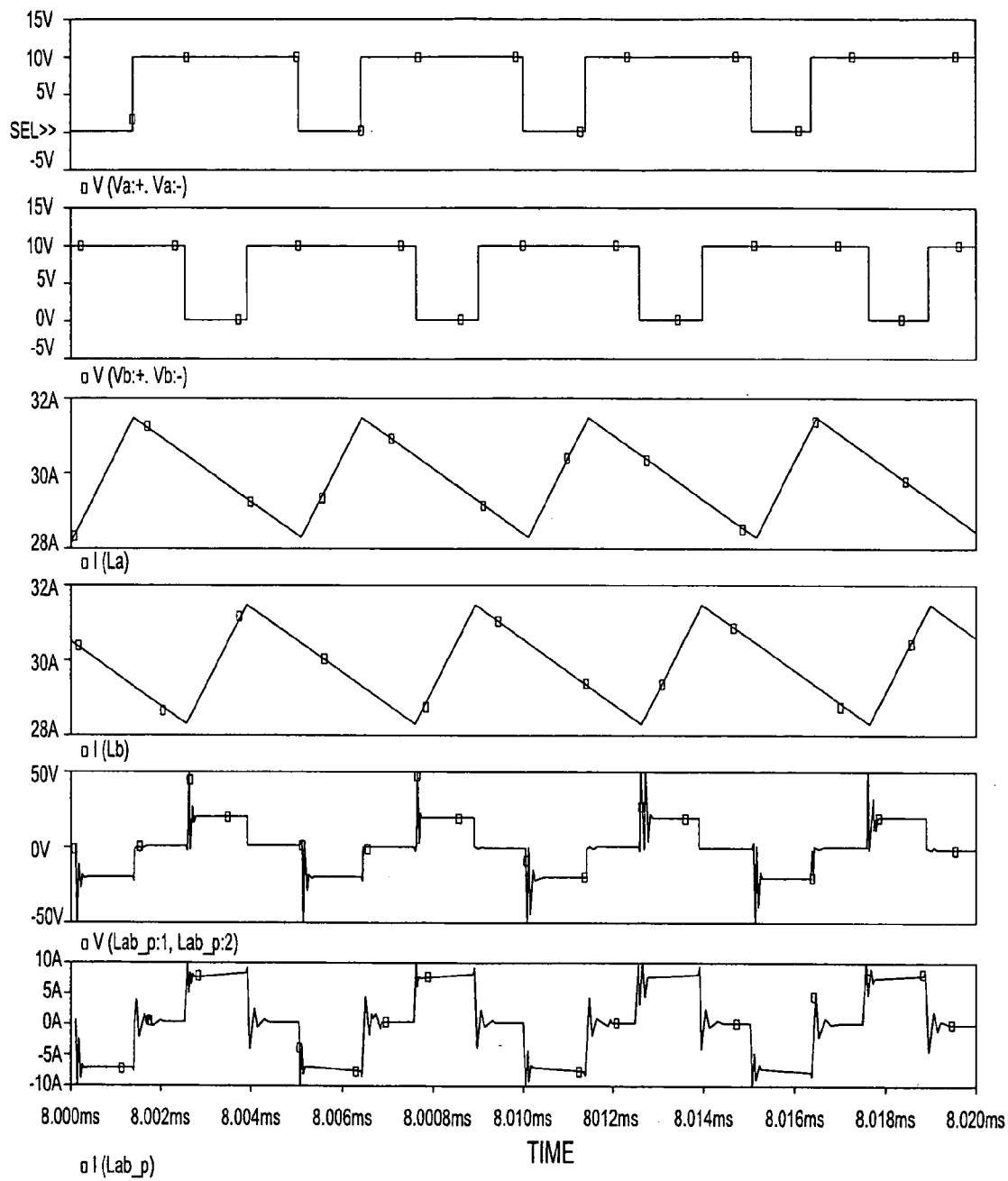
FIG. 10 is a graph of a result from a simulation of a DC—DC converter with a prior art non-interleaved topology with one current doubler secondary side and a half bridge primary side.

From FIGS. 8–10, one skilled in the art will appreciate that for the same output ripple frequency, 400 kHz, or in other words, a primary side switching frequency of 200 kHz, the switching frequency of the switches of the two interleaved current doublers, 100 kHz, is half compared the non-interleaved single current doubler, 200 kHz. Even at the transformers' primary side windings, as is the case at the secondary side windings, the current is half for the interleaved topology compared to the non-interleaved topology because of the parallel connection. Moreover, the current in each output inductor is also half compared to the non-interleaved topology, or in other words, it is one-fourth of the total output current.

F. Experimental Results

An interleaved four-channel (i.e., two current doublers) with a symmetrically controlled half-bridge (primary side) prototype, as in FIG. 2, was built for experimental verification with a 48V input and 1.5V/60 A output at 400 kHz. The output inductors $L_a$, $L_b$, $L_c$, $L_d$ were about 1.8 µH each with a T37-8/90 core and 14AWG wire. The isolation transformers' $T_{ab}$, $T_{cd}$ turns ratios were 4:1 and the inverse coupled inductors' (the interleaving transformer with inverse coupled windings) turns ratio was 1:1. IRFS59N10Ds available from International Rectifier Corporation of El Segundo, Calif. were used for the two primary switches S1 and S2 and Si4420DY MOSFETs available from Vishay Siliconix of Shelton, Conn. were used for the secondary side switches Sa, Sb, Sc and Sd, two paralleled in each channel. IR2110 drivers available from International Rectifier Corporation and TC4421 drivers available from Microchip Technology of Mountain View, Calif. were also used to drive the primary and secondary-sides switches, respectively.

Figure 11:
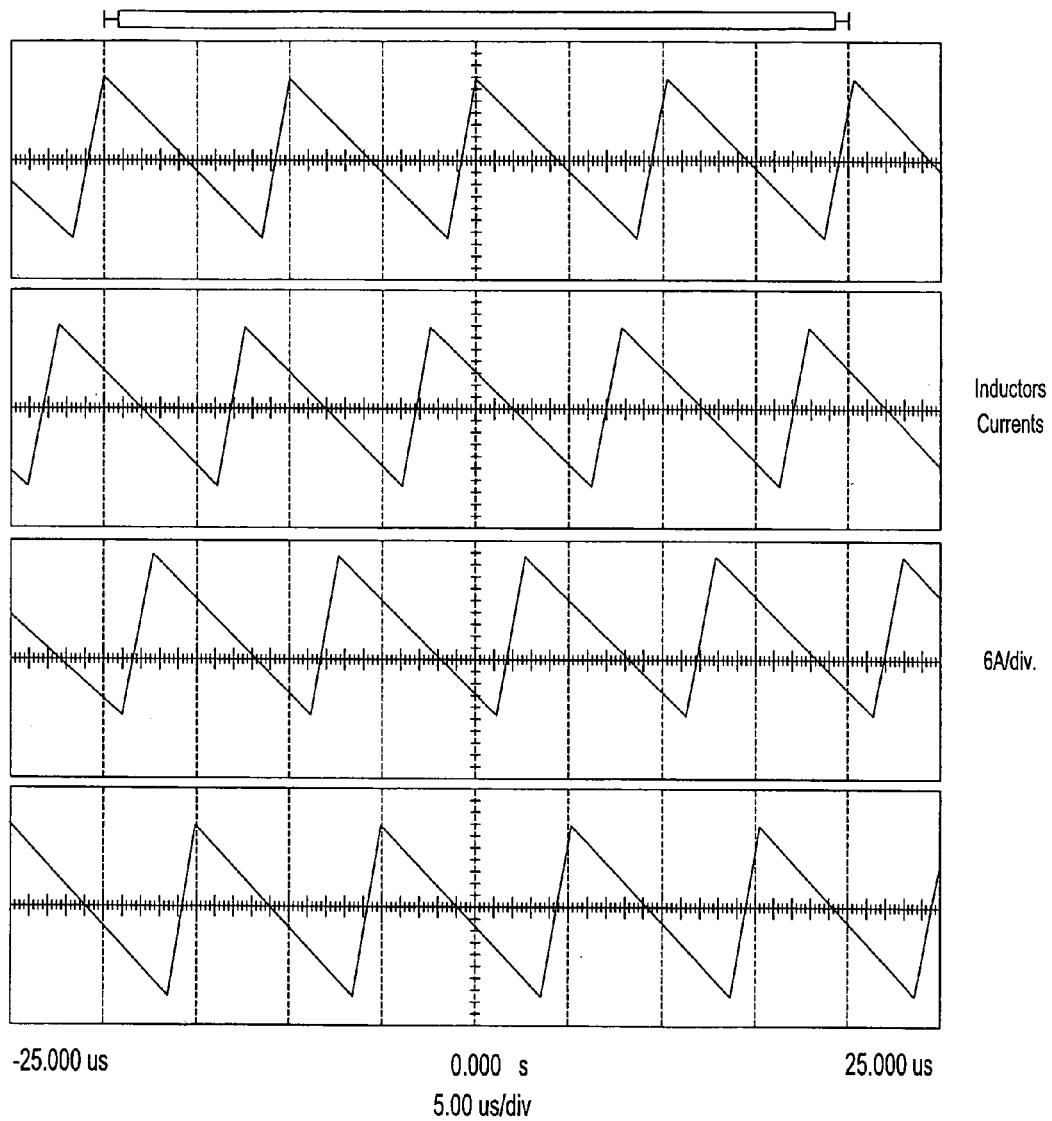
FIG. 11 is a graph that illustrates a waveform for four interleaved indicator currents in accordance with one embodiment of the invention.
Figure 12:
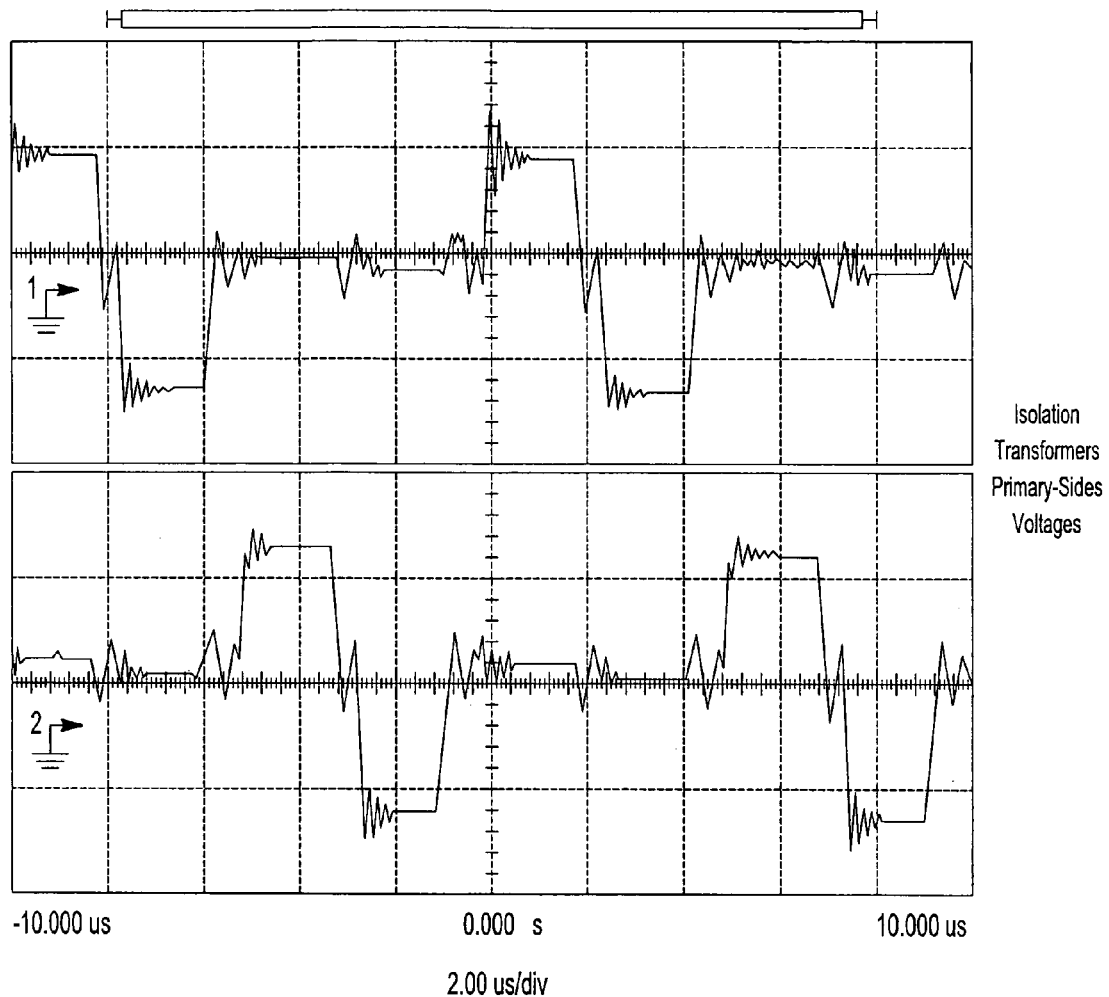
FIG. 12 is a graph that illustrates a waveform for the primary side voltages of two isolation transformers in accordance with one embodiment of the invention.
Figure 13:
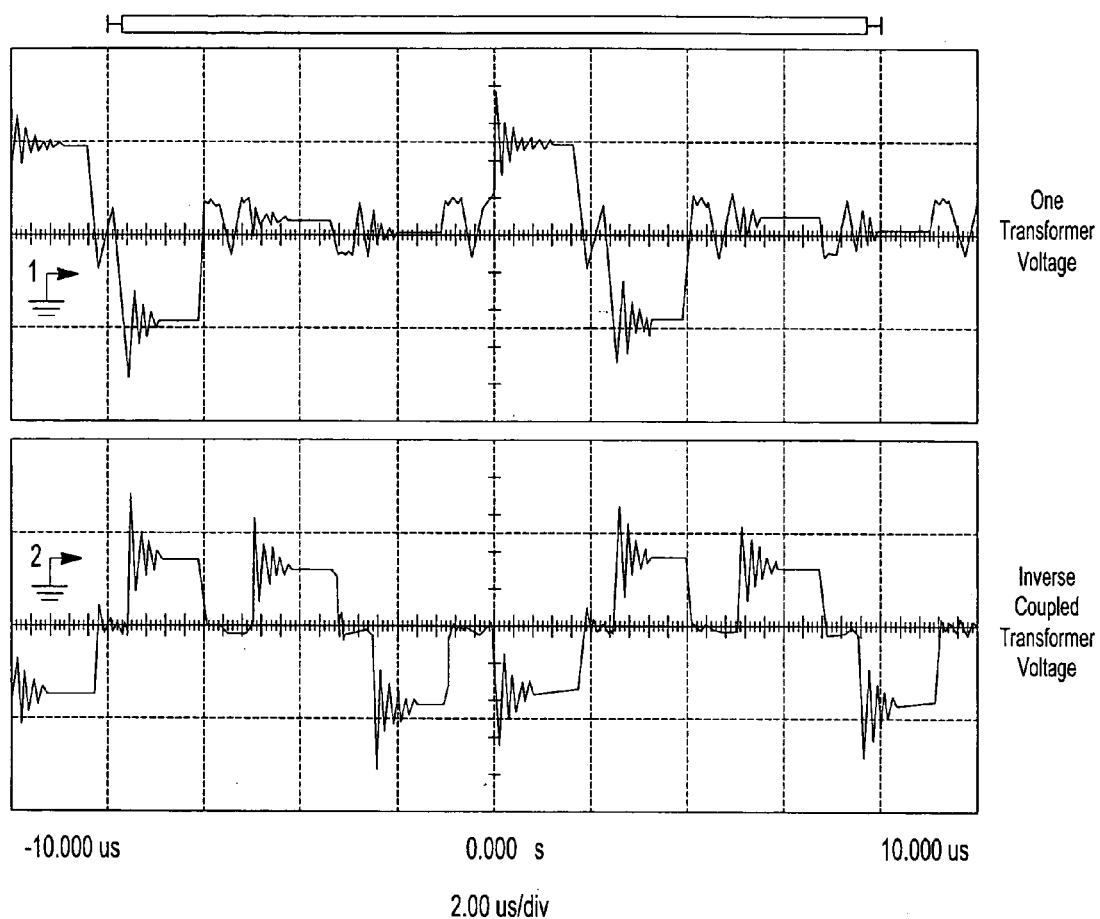
FIG. 13 is a graph that illustrates a waveform for the primary side voltage of one isolation transformer and the voltage on one side of the transformer having inverse coupled windings in accordance with one embodiment of the invention.

FIG. 11 shows the experimental results for the currents of four interleaved output inductors, phase shifted by 90°. FIG. 12 graphically illustrates the results for the two isolation transformers' primary side voltages, whereas FIG. 13 shows the results of the primary side voltage of one isolation transformer and the voltage of one side of the transformer having inverse coupled windings. FIG. 14 shows the primary side isolation transformers' winding currents. The experimental results clearly support the theoretical and simulation results.

FIG. 15 is a flow diagram of one method of forming a power converter in accordance with one embodiment of the invention. In this embodiment, the power converter has a primary side and a plurality of secondary sides coupled in parallel with each other. Each secondary side is coupled to the primary side by a transformer having a primary winding and a secondary winding coupled to the secondary side. The method includes coupling the primary windings of the transformers in parallel to the primary side so that the secondary sides can be interleaved. At operation 400, the primary windings of each transformer are coupled in parallel to the primary side through respective windings of at least one transformer having inverse coupled windings. At operation 410, the secondary sides are interleaved.

Generally, the interleaving method of the present invention for isolated topologies in which the secondary-side switches operate at a lower switching frequency than the primary-side switches improves the efficiency and transient response of a power converter. Moreover, by applying the interleaving method of the present invention, both primary and secondary sides of the isolation transformers are connected in parallel allowing sharing of currents at both primary and secondary sides. This allows for better thermal management.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power converter, comprising:
a first transformer having a primary winding and a secondary winding, the secondary winding coupled to a first secondary side of the power converter;
a second transformer having a primary winding and a secondary winding, the secondary winding coupled to a second secondary side of the power converter;
the primary windings of the first and second transformers coupled in parallel to a primary side of the power converter through respective windings of a transformer having inverse coupled windings, the secondary windings of the first and second transformer coupled in parallel, and
the second secondary side of the power converter interleaved with the first secondary side of the power converter.

2. The power converter of claim 1 wherein the secondary sides of the power converter operate at a lower switching frequency than a switching frequency at which the primary side of the power converter operates.

3. The power converter of claim 1 wherein the transformer having inverse coupled windings has a turns ratio of 1:1.

4. The power converter of claim 1 wherein the respective inverse coupled windings of the transformer having inverse coupled windings include first and second inverse coupled windings, the first winding coupled between the primary winding of the first transformer and the primary side of the power converter and the second winding coupled between the primary winding of the second transformer and the primary side of the power converter.

5. The power converter of claim 1 wherein the primary side of the power converter is selected from the group consisting essentially of a half-bridge topology, a phase-shifted full-bridge topology, and an active-clamp topology.

6. The power converter of claim 1 wherein the secondary sides of the power converter are selected from the group consisting essentially of a current doubler topology, a forward tapped topology and a center tapped topology.

7. The power converter of claim 1 wherein the power converter is a DC—DC converter.

8. A DC—DC converter, comprising:
a primary side and a plurality of secondary sides;
a coupling transformer for each secondary side of the power converter coupling that secondary side of the power converter to the primary side of the power converter, the secondary sides of the power converter coupled in parallel and interleaved; and
each coupling transformer having a primary winding coupled in parallel through respective windings of at least one transformer having inverse coupled windings to the primary side of the power converter.

9. The DC—DC converter of claim 8 and further including N-1 transformers having inverse coupled windings where N is the number of secondary sides of the power converter.

10. The DC—DC converter of claim 8 having at least three secondary sides and three coupling transformers, the primary windings of two of the coupling transformers coupled in parallel through respective windings of a first one of the transformers having inverse coupled windings, the windings of the first one of the transformers having inverse coupled windings coupled in parallel with the primary winding of the third coupling transformer to the primary side of the power converter through respective windings of a second one of the transformers having inverse coupled windings.

11. The DC—DC converter of claim 10 wherein the first one of the transformers having inverse coupled windings has a turns ratio of 1:1 and the second one of the transformers having inverse coupled windings has a turns ratio of 2:1.

12. The DC—DC converter of claim 8 having at least four secondary sides and four coupling transformers, the primary windings of a first two of the coupling transformers coupled in parallel through respective windings of a first one of the transformers having inverse coupled windings, the primary windings of a second two of the coupling transformers coupled in parallel through respective windings of a second one of the transformers having inverse coupled windings, the first and second ones of the transformers having inverse coupled windings coupled in parallel to the primary side of the power converter through respective windings of a third one of the transformers having inverse coupled windings.

13. The DC—DC converter of claim 12 wherein the first, second and third ones of the transformers having inverse coupled windings have a turns ratio of 1:1.

14. The DC—DC converter of claim 8 wherein the primary side of the power converter is selected from the group consisting essentially of a half-bridge topology, a phase-shifted full-bridge topology, and an active-clamp topology and the secondary sides of the power converter are selected from the group consisting essentially of a current doubler topology, a forward tapped topology and a center tapped topology.

15. The DC—DC converter of claim 9 having an even number of secondary sides and each of the transformers having inverse coupled windings having a turns ratio of 1:1.

16. The DC—DC converter of claim 9 having an odd number of secondary sides with all but one of the transformers having inverse coupled windings having a turns ratio of 1:1 and the remaining one of the transformers having inverse coupled windings having a turns ratio of 2:1.

17. The DC—DC converter of claim 16 wherein the coupling transformers are grouped in pairs leaving one coupling transformer not grouped in a pair, the primary windings of each pair of coupling transformers coupled through the respective windings of a respective one of the transformers having inverse coupled windings with the 1:1 turns ratio and the primary winding of the coupling transformer not grouped in a pair coupled through a respective winding of the transformer having inverse coupled windings with the 2:1 turns ratio.

18. The power converter of claim 8 wherein the secondary sides of the power converter operate at a lower switching frequency than a switching frequency at which the primary side of the power converter operates.

19. In a power converter having a primary side and a plurality of secondary sides coupled in parallel with each other, each secondary side of the power converter coupled to the primary side of the power converter by a transformer having a primary winding and a secondary winding coupled to that secondary side of the power converter, a method of coupling the primary windings of the transformers in parallel to the primary side of the power converter so that the secondary sides of the power converter can be interleaved, comprising:
   coupling the primary windings of each transformer in parallel to the primary side of the power converter through respective windings of at least one transformer having inverse coupled windings, and
   interleaving the secondary sides of the power converter.

20. In a DC—DC converter having a primary side and a plurality of secondary sides coupled in parallel with each other, each secondary side of the power converter coupled to the primary side of the power converter by a transformer having a primary winding and a secondary winding coupled to that secondary side of the power converter, a method of coupling the primary windings of the transformers in parallel to the primary side of the power converter so that the secondary sides of the power converter can be interleaved, comprising:
   coupling the primary windings of each transformer in parallel to the primary side of the power converter through respective windings of at least transformer having inverse coupled windings, and
   interleaving the secondary sides of the power converter.

* * * * *